L. O'Brien.
Carding Mach.

No. 1,865. Reissued Feb. 7, 1865.

Witnesses
J. W. Coombs
M. S. Partridge

Inventor
L. O'Brien
per Munn & Co
Attorneys

N. PETERS, PHOTO-LITHOGRAPHER, WASHINGTON, D. C.

UNITED STATES PATENT OFFICE.

LAWRENCE O'BRIEN, OF INDIANAPOLIS, INDIANA.

IMPROVEMENT IN CARDING-MACHINES.

Specification forming part of Letters Patent No. 40,181, dated October 6, 1863; Reissue No. 1,865, dated February 7, 1865.

*To all whom it may concern:*

Be it known that I, LAWRENCE O'BRIEN, of Indianapolis, in the county of Marion and State of Indiana, have invented a new and useful Improvement in Carding-Machines; and I do hereby declare that the following is a full, clear, and exact description thereof, which will enable others skilled in the art to make and use the same, reference being had to the accompanying drawings, forming part of this specification, in which—

Figure 1:
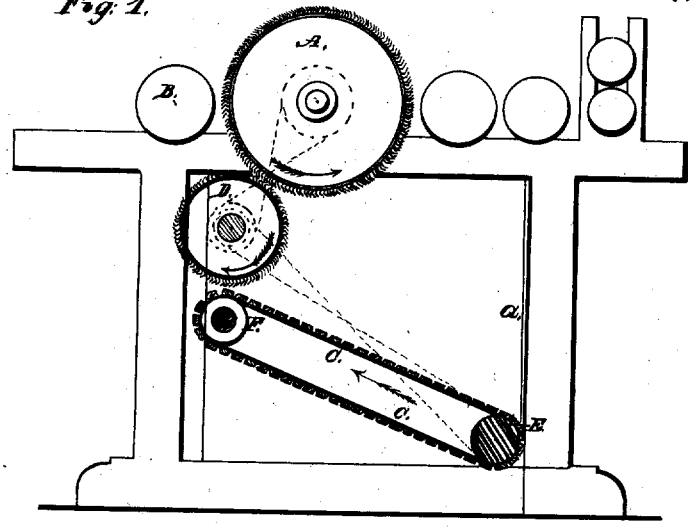
Figure 2:
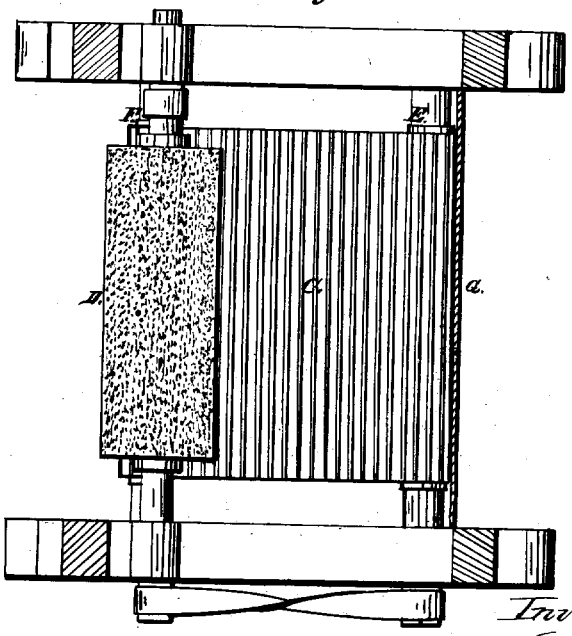

Figure 1 is a vertical section of a machine with my improvement. Fig. 2 is a horizontal section of the same just below the main card-cylinder.

Similar letters of reference indicate like parts.

The object of this invention is to return to the main cylinder of a carding-machine all the fiber which drops from the machine in the carding operation, so that when the fiber is once fed it will go through without loss, and at the same time be freed from dirt and other foreign matter.

The invention consists in a novel arrangement of a card-clothed roller or stripper, in combination with an endless apron placed in such relation to the main card-cylinder that the current of air arising from the rapid revolution of said cylinder will have no effect on the loose fiber as it lies on the apron by which it is carried forward to the roll or stripper and delivered to the main card-cylinder, where it is again incorporated with the mass of material and passed through the machine without loss.

A is the main cylinder, and B the doffer, which is constructed in the usual manner. C is the endless apron, and D the roll or stripper, the peculiar arrangement and construction of which constitutes my invention. The apron is to be made of semi-cylindrical laths, nailed on strips of leather or other substantial material, with their edges touching so that no dirt can pass between them. The upper surface of the apron thus forms alternate depressions and elevations, so that the fiber may lie on the elevations, while the dirt, by the shaking of the apron and of the machine, falls into the depressions, and in this manner is carried under the roll D, which catches the fiber and elevates it to the main card-cylinder A, and the dirt falls to the floor as the apron passes over the roller F. If any hard substance—such as burrs, chips, &c.—which generally adhere to wool and cotton, fall on the apron, they will lie in the depressions and not be taken up with the fibers by the roll D and delivered to the main card-cylinder A, as they otherwise would; and, furthermore, the teeth of said roll are preserved from injury, which they invariably sustain if they come in contact with such hard substances.

The apron is stretched over rollers E F in an inclined position, and the roll D is large enough to allow the apron to be placed at such a distance from the main card-cylinder A as not to be affected by the current of air caused by the rapid motion of the latter. The roller F is situated directly under the roll D in such a position that said roll takes the fiber off from the apron C. The other roller, E, is fastened under the feeding end of the machine close to the floor, and it is provided with flanges on its ends to guide the apron.

Motion can be imparted to the various devices from any part of the machine, so that the same runs slow and in the direction indicated by the arrows in Figs. 1 and 2.

By the interposition between the main cylinder A and apron C of a roll or stripper, D, moving much slower than the main card-cylinder and employed to convey the fiber from the apron, I am enabled to place said apron at such a distance from the main cylinder that the current of air has no action on the fiber and said fiber can be constantly and uniformly delivered, whereas in other machines provided with an endless apron a great difficulty arises from the fact that by the current of air created by the main cylinder and running rapidly in close proximity to the surface of the apron the fiber is repelled with the dirt until both together collect in masses, which are liable to clog up the machine.

I do not claim, broadly, the employment of an endless apron in combination with the main card-cylinder or the use of a grid or screen in any form in connection with a carding-machine; but

I claim as new and desire to secure by Letters Patent—

1. The arrangement of the roll D between the main card cylinder A and the endless apron C, substantially as and for the purpose set forth.

2. The construction of the endless apron C, substantially as herein described, so as to carry the fibers on top of the slats and dust and other foreign matters between them, the fibers being delivered to the roll D and the foreign matters discharged in passing over the upper roll, F, when the same is applied in the manner specified.

LAWRENCE O'BRIEN.

Witnesses:
GEO. E. GEISENDORFF,
ISAAC THALMAN.